United States Patent
Kilgore et al.

(10) Patent No.: US 6,497,786 B1
(45) Date of Patent: *Dec. 24, 2002

(54) METHODS AND APPARATUS FOR BONDING DEFORMABLE MATERIALS HAVING LOW DEFORMATION TEMPERATURES

(75) Inventors: Bruce J. Kilgore, Lake Oswego, OR (US); Thomas McKnight, Silver Springs, MD (US); Roy Lynn O'Mohunddro, Wilsonville, OR (US); John A. Battista, Jr., Boulder, CO (US); Richard J. Petrucci, Denver, CO (US); Zakaryae Fathi, Cary, NC (US); Jianghua Wei, Raleigh, NC (US)

(73) Assignee: Nike, Inc., Beaverton, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,532

(22) Filed: Nov. 6, 1997

(51) Int. Cl.⁷ .............................................. B27G 11/02
(52) U.S. Cl. ...................... 156/379.8; 100/90; 156/104; 156/273.7; 156/382; 219/679
(58) Field of Search .......................... 156/273.7, 379.8, 156/104, 382; 219/679; 100/90

(56) References Cited

U.S. PATENT DOCUMENTS

| | | |
|---|---|---|
| 2,441,097 A | 5/1948 | Hicks |
| 2,742,390 A | 4/1956 | Beck |
| 3,458,808 A | 7/1969 | Agdur |
| 3,471,352 A | 10/1969 | Brooke et al. |
| 3,611,135 A | 10/1971 | Margerum |
| 3,612,803 A | 10/1971 | Klaas |
| 3,619,252 A | 11/1971 | Roscher |

(List continued on next page.)

FOREIGN PATENT DOCUMENTS

| | | |
|---|---|---|
| DE | 19 63 711 A | 7/1971 |
| DE | 39 30 352 A | 3/1991 |
| EP | 0 060 377 A | 9/1982 |
| EP | 0 705 682 A | 4/1996 |
| FR | 1 078 014 A | 11/1954 |
| FR | 2 570 580 A | 3/1986 |
| GB | 1 326 292 A | 8/1973 |
| GB | 2 240 980 A | 8/1991 |
| WO | WO 87 06526 A | 11/1987 |
| WO | WO 97 36728 A | 10/1997 |
| WO | WO 97 36965 A | 10/1997 |

OTHER PUBLICATIONS

PCT International Search Report, International Application No. PCT/US98/23907.

Lauf, R. J., et al., "Polymer Curing in a Variable Frequency Microwave Oven" Microwave Power Symposium, Jul. 1993, pp. 150–155.

(List continued on next page.)

Primary Examiner—John J. Gallagher
(74) Attorney, Agent, or Firm—Banner & Witcoff, Ltd.

(57) ABSTRACT

Systems, methods and apparatus are disclosed for bonding a plurality of substrates via a solventless, curable adhesive. At least one of the substrates has a deformation temperature below the activation temperature of the adhesive. A workpiece is assembled from a plurality of substrates with the curable adhesive disposed therebetween. Pressure is applied to the workpiece and the workpiece is irradiated with variable frequency microwave energy. The workpiece is swept with at least one window of microwave frequencies selected to heat the adhesive without heating the substrates above their respective deformation temperatures.

15 Claims, 8 Drawing Sheets

U.S. PATENT DOCUMENTS

| | | | | |
|---|---|---|---|---|
| 3,620,875 | A | 11/1971 | Guglielmo, Sr. | |
| 3,620,876 | A | 11/1971 | Guglielmo et al. | |
| 3,769,133 | A * | 10/1973 | Halberschmidt et al. | 156/382 |
| 3,888,715 | A | 6/1975 | Fraser et al. | |
| 3,917,503 | A | 11/1975 | Tamura et al. | |
| 3,941,641 | A | 3/1976 | Heller, Jr. et al. | |
| 3,964,951 | A | 6/1976 | Kremer et al. | |
| 4,035,547 | A | 7/1977 | Heller, Jr. et al. | |
| 4,067,765 | A | 1/1978 | Heller, Jr. et al. | |
| 4,106,969 | A | 8/1978 | Puyplat | |
| 4,120,712 | A | 10/1978 | Sindt | |
| 4,144,468 | A | 3/1979 | Mourier | |
| 4,176,268 | A | 11/1979 | Gerling | |
| 4,180,426 | A | 12/1979 | Krumm et al. | |
| 4,196,332 | A | 4/1980 | MacKay et al. | |
| 4,340,796 | A | 7/1982 | Yamaguchi et al. | |
| 4,381,602 | A | 5/1983 | McIver | |
| 4,415,789 | A | 11/1983 | Nobue et al. | |
| 4,425,406 | A * | 1/1984 | Palma | 156/382 |
| 4,454,619 | A | 6/1984 | Bichet | |
| 4,456,498 | A * | 6/1984 | Churchland | 156/273.7 |
| 4,504,718 | A | 3/1985 | Okatsuka et al. | |
| 4,554,347 | A | 11/1985 | Hawkes, Jr. | |
| 4,568,262 | A | 2/1986 | Feurer | |
| 4,593,167 | A | 6/1986 | Nilssen | |
| 4,601,772 | A * | 7/1986 | McKelvey | 156/382 |
| 4,626,642 | A * | 12/1986 | Wang et al. | 156/272.4 |
| 4,653,855 | A | 3/1987 | Birnbach et al. | |
| 4,684,777 | A | 8/1987 | Maher et al. | |
| 4,707,402 | A | 11/1987 | Thorsrud | |
| 4,733,165 | A | 3/1988 | Richardson et al. | |
| 4,825,028 | A | 4/1989 | Smith | |
| 4,839,588 | A | 6/1989 | Jantsch et al. | |
| 4,843,202 | A | 6/1989 | Smith et al. | |
| 4,855,553 | A | 8/1989 | Minobe | |
| 4,859,268 | A | 8/1989 | Joseph et al. | |
| 4,866,344 | A | 9/1989 | Ross et al. | |
| 4,869,767 | A | 9/1989 | Robinson et al. | |
| 4,880,486 | A | 11/1989 | Maeda | |
| 4,904,928 | A | 2/1990 | Lewis | |
| 4,906,497 | A | 3/1990 | Hellmann et al. | |
| 4,939,331 | A | 7/1990 | Berggren et al. | |
| 4,959,614 | A | 9/1990 | Bowling et al. | |
| 4,969,968 | A | 11/1990 | Leatherman | |
| 5,039,947 | A | 8/1991 | Kraszewski et al. | |
| 5,072,087 | A | 12/1991 | Apte et al. | |
| 5,108,532 | A * | 4/1992 | Thein et al. | 156/382 |
| 5,120,176 | A | 6/1992 | Bhatia et al. | |
| 5,129,977 | A * | 7/1992 | Leatherman | 156/273.7 |
| 5,166,230 | A | 11/1992 | Stecker | |
| 5,182,134 | A | 1/1993 | Sato | |
| 5,222,543 | A | 6/1993 | Carlstrom et al. | |
| 5,232,748 | A | 8/1993 | Horowitz et al. | |
| 5,240,542 | A | 8/1993 | Miller et al. | |
| 5,241,040 | A | 8/1993 | Cuomo et al. | |
| 5,254,197 | A * | 10/1993 | Klems | 156/273.7 |
| 5,254,824 | A | 10/1993 | Chamberlain et al. | |
| 5,272,216 | A | 12/1993 | Clark, Jr. et al. | |
| 5,296,074 | A | 3/1994 | Graham et al. | |
| 5,296,271 | A | 3/1994 | Swirbel et al. | |
| 5,317,045 | A | 5/1994 | Clark et al. | |
| 5,317,081 | A | 5/1994 | Gelorme et al. | |
| 5,321,222 | A | 6/1994 | Bible et al. | |
| 5,324,345 | A | 6/1994 | Rutjes et al. | |
| 5,328,539 | A | 7/1994 | Sato | |
| 5,331,284 | A | 7/1994 | Jean et al. | |
| 5,338,611 | A | 8/1994 | Lause et al. | |
| 5,342,659 | A | 8/1994 | Horowitz et al. | |
| 5,366,573 | A | 11/1994 | Bayer et al. | |
| 5,378,298 | A | 1/1995 | Williams et al. | |
| 5,397,993 | A | 3/1995 | Tews et al. | |
| 5,400,460 | A | 3/1995 | Roeker et al. | |
| 5,421,789 | A | 6/1995 | Gregg | |
| 5,433,804 | A | 7/1995 | Nottingham et al. | |
| 5,462,627 | A | 10/1995 | Oldham et al. | |
| 5,804,801 | A * | 9/1998 | Lauf et al. | 156/273.7 |

OTHER PUBLICATIONS

A. Stuart Wood, "Advanced Thermoplastic Composites Get Full Automation Treatment" Modern Plastics International, vol. 17, No. 4, Apr. 1987, pp. 44–47.

Patent Abstracts of Japan, vol. 096, No. 007, Jul. 31, 1996, and JP 08 070911A Mar. 19, 1996.

Patent Abstracts of Japan, vol. 1997, No. 09, Sep. 30, 1997, and JP 09 128823A May 16, 1997, and US 5,779,855A Jul. 14, 1998.

Database WPI, Section Ch, Week 198535, Derwent Publications, Ltd., London, GB, Class A32, AN 1985–213118, and JP 60 135230A Jul. 18, 1985.

Database WPI, Section Ch, Week 198031, Derwent Publications, Ltd., London, GB, Class A35, AN 1980–54112C, and JP 55 079116A Jun. 14, 1980.

Bible et al., Multikilowatt Variable Frequency Microwave Furnace (Apr. 1992), 4 pgs.

Rudder et al., Diamond Chemical Vapor Deposition (CVD) Via Microwave–Excited Plasma From Water–Ethanol Solutions (Apr. 1993) pp. 377–384.

Johnson et al., Use of a Variable Frequency Microwave Furnace For Large–Area, Uniform Processing (Apr. 1993) pp. 563–570.

Lauf et al., Materials Processing Using A Variable Frequency Microwave Furnace (Apr. 1993) pp. 571–579.

Espinosa et al., Use of Variable Frequency Microwave Power To Achieve Uniform Results Throughout Large Volumes For Material Processing (Jul. 1993) pp. 26–31.

Lauf et al., Polymer Curing In A Variable Frequency Microwave Oven (Jul. 1993) pp. 150–155.

Lauf et al., 2 to 18 GHz Broadband Microwave Heating Systems (Nov. 1993) 4 pgs.

Johnson et al., Effect of Bandwidth on Uniformity of Energy Distribution In A Multi–Mode Cavity (Apr. 1994) 6 pgs.

Demeuse et al., Variable Frequency Microwave Processing of Thermoset Polymer Matrix Composites (Apr. 1994) 6 pgs.

Johnson et al., Use of Variable Frequency Microwave Energy as a Flexible Plasma Tool (Apr. 1994) 6 pgs.

DeMeuse et al., Microwave Processing of Isocyanate/Epoxy Composites (May 1994) 12 pgs.

Zak Fathi, Ph.D., Variable Frequency Microwave Furnace, 9 pgs.

* cited by examiner

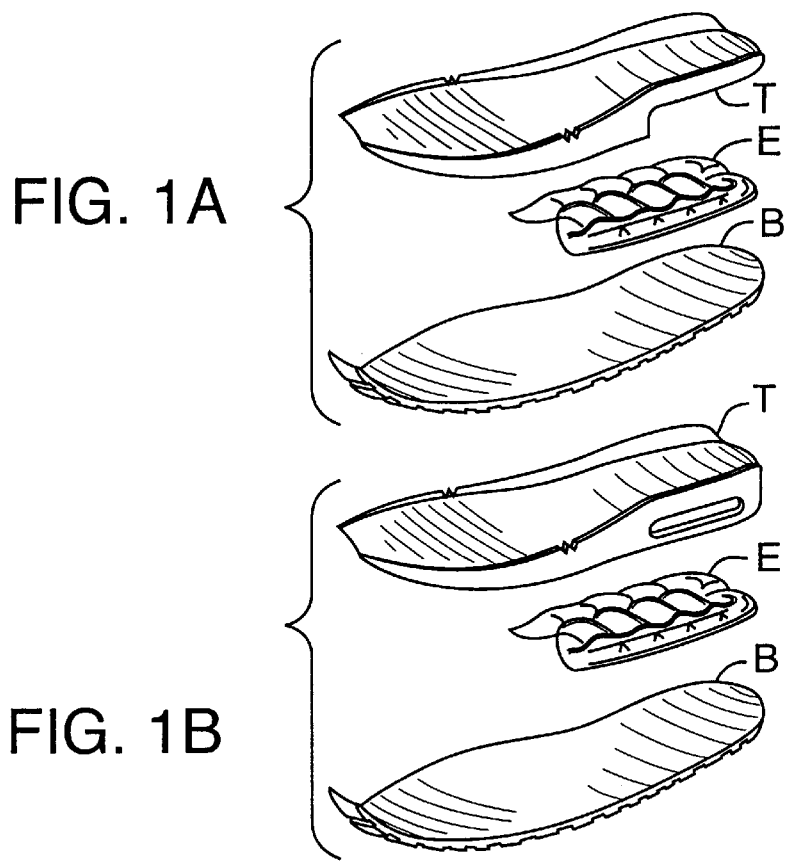
FIG. 1A
FIG. 1B
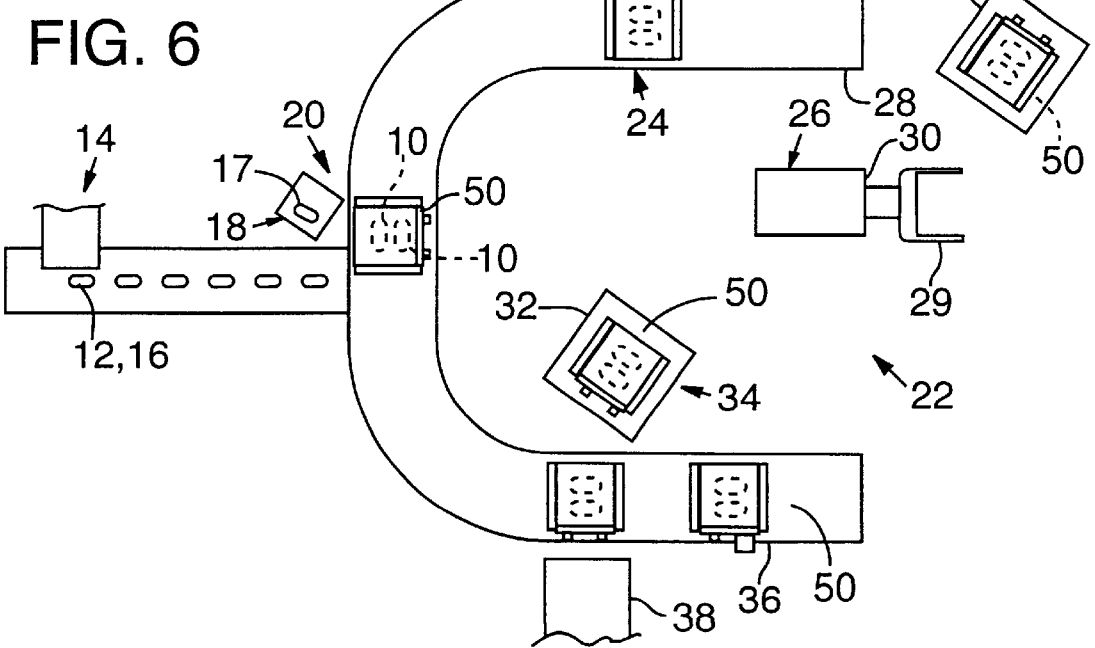
FIG. 6

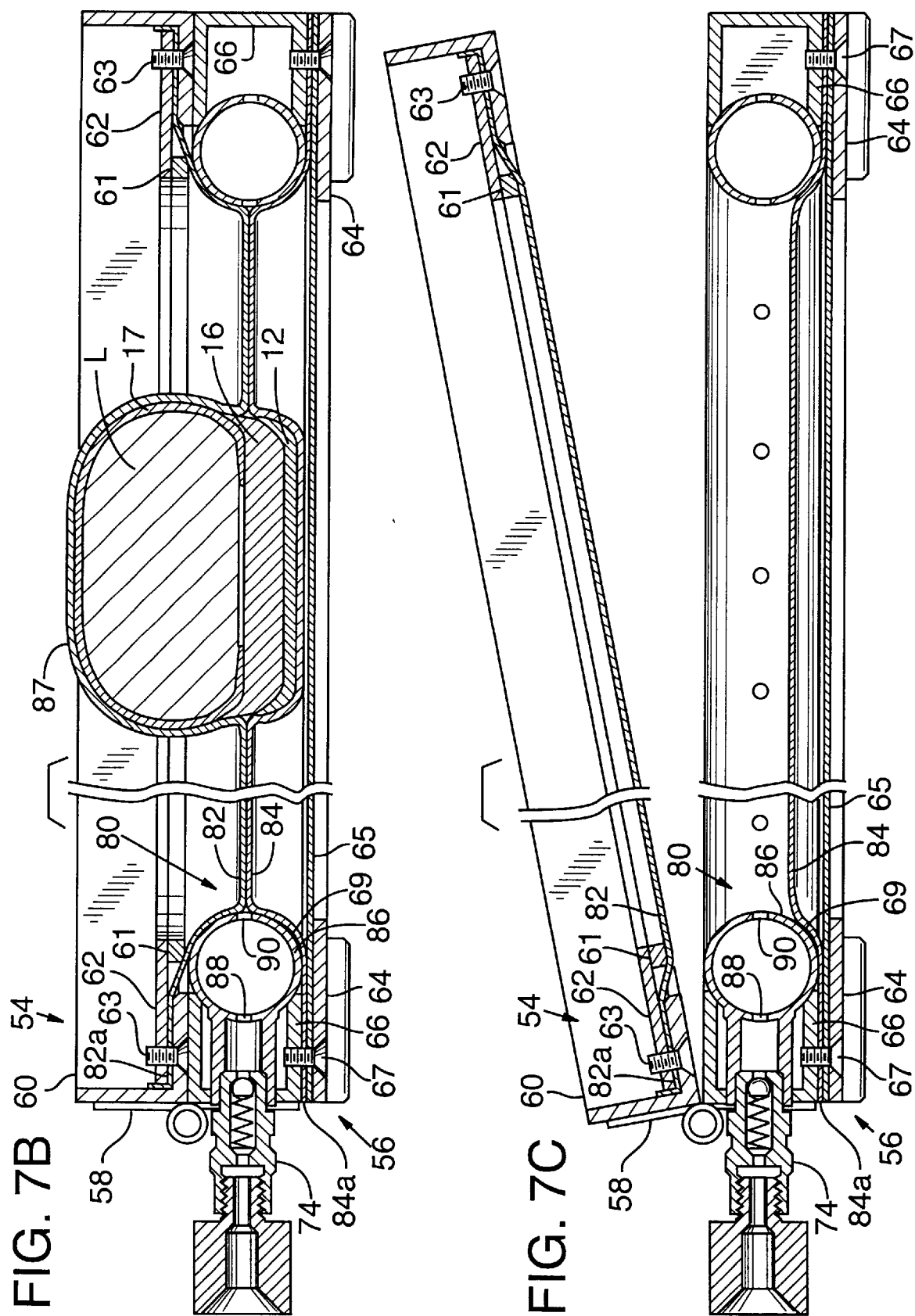

METHODS AND APPARATUS FOR BONDING DEFORMABLE MATERIALS HAVING LOW DEFORMATION TEMPERATURES

TECHNICAL FIELD OF THE INVENTION

The present invention relates generally to the bonding of materials, and more particularly to adhesive bonding of deformable materials.

BACKGROUND OF THE INVENTION

Bonded materials, i.e., a plurality of substrates adhered by adhesive, are found in goods of various types. Plywood is but one example of bonded material well known to the public. Bonded materials, such as plywood, that are intended to have great strength, may require high strength adhesives. High performance thermoset or thermoplastics adhesives, which are devoid of solvent, are used in most high performance bonding applications. Thus, processing is often carried out at a relatively high temperature sufficient to activate the adhesive. High strength materials are typically processed under conditions, such as high temperature and pressure, to ensure that a strong bond is formed. Indeed, bonding, whether for consumer and durable goods or defense and aerospace applications, is one of the most demanding processes in industry.

Shoes, particularly athletic shoes, often comprise bonded materials. In particular, a sole assembly, i.e., the midsole and outsole, often are bonded together. Bonding of the midsole with the outsole is particularly important.

Whereas high performance thermoset or thermoplastics adhesives are used in most high performance bonding applications, solvent-based adhesives are used in most applications involving bonding of low grade materials, typically for both consumer and durable goods. Bonding of outsoles and midsoles in athletic shoe manufacturing is an example of such an application. However, solvent based adhesives may be environmentally objectionable. A bonding process using solvent based adhesive typically is a slow process, not only because evaporation of solvent takes time, but also because adhesives often must be applied several times on both substrates to form the required bond.

A solvent-based process thus may require a long processing time and care may need to be taken to prevent environmental damage and deleterious health effects caused by solvents. Therefore, it is preferable to use a high performance adhesive, such as a thermoplastic (e.g., hot melt) or a thermoset adhesive, for these bonding applications. A bonding process using a solventless adhesive is a "green" process, i.e., is environmentally unobjectionable. Such a process also typically is relatively quicker because it can be automated. Typically, these high performance adhesives require only one application and can be rapidly activated with appropriate heat sources.

Unfortunately, most materials used in consumer and durable goods require high performance at relatively low temperatures (typically −30 to 80° C.), and tend to deform at the activation temperatures of such adhesives if the entirety of the substrate is heated to the requisite temperature.

Materials that deform at a temperature below the activation temperature of an adhesive are difficult to heat as an entirety to a temperature sufficient to form the required bond. Therefore, a selective heating technique, such as single-mode or multi-mode fixed frequency microwave irradiation, has been suggested. However, microwave processing of materials to be bonded has not yet met with much commercial success due to the non-uniform energy distribution inside microwave cavities powered with fixed frequencies. The electromagnetic energy distribution is directly related to the magnitude and configuration of the electric field pattern inside the microwave cavity and is usually localized to specific regions. It is this non-uniform distribution of electromagnetic energy that results in problems during microwave processing, such as non-uniform processing, and difficulties in implementing such processing, such as size limitations on the materials to be bonded.

A fixed frequency microwave signal launched within a microwave cavity is reflected a plurality of times, eventually establishing modal patterns of energy distribution. The overall distribution of electromagnetic energy is not uniform throughout the microwave cavity, resulting in both high and low energy field areas, i.e., hot and cold spots. Microwave heating using multiple modes has succeeded in various food and rubber related applications where the tolerance for thermal gradient is high. Whereas thermal gradients produced by nonuniform electromagnetic energy distribution to a certain extent can be accommodated in certain applications, such gradients cannot be tolerated in other materials.

Therefore, there exists a need for a process for bonding materials that deform at a temperature lower than the activation temperature of a high performance adhesive, such as a thermoplastic or a thermoset adhesive.

SUMMARY OF THE INVENTION

This invention is directed to a method for bonding materials having low deformation temperatures using thermoplastic or thermoset adhesives, preferably solventless adhesives. In particular, the invention is directed to bonding materials having deformation temperatures lower than the activation temperature of the adhesive.

In accordance with the method, the materials to be bonded are exposed to energy (e.g., variable frequency microwave irradiation) at frequencies selected to heat the adhesive in preference to heating the substrate material having a low deformation temperature.

According to another aspect of the present invention, an apparatus is provided for applying pressure to a workpiece irradiated with microwave energy. The apparatus includes a rigid frame having opposing top and bottom portions. The frame may be formed from substantially microwave transparent material or may be coated with electrical insulation to suppress arcing when exposed to microwave irradiation.

A diaphragm assembly is disposed between the top and bottom frame portions. The diaphragm assembly includes substantially microwave transparent upper and lower membranes formed from flexible material such as silicone rubber, and the like. The upper and lower membranes are sealed along peripheral edge portions thereof to a manifold to form a chamber between opposing inner surfaces of the upper and lower membranes. The chamber is configured to receive a workpiece and to apply pressure to the workpiece when a vacuum is created within the chamber. At least one of the upper and lower membrane inner surfaces may be provided with a raised pattern for facilitating the removal of air from within the chamber.

The manifold may include at least one aperture for facilitating the removal of air from the chamber. The manifold may also include at least one aperture connected to an air pump or other suitable device for facilitating the movement of air to and from the manifold. Opposing top and bottom portions may be pivotally attached along adjacent edge portions to facilitate placing a workpiece to be processed within the chamber.

Another aspect of the invention relates to a system for bonding a workpiece comprising a plurality of substrates. The system includes a device for applying pressure to a workpiece formed of a plurality of substrates having adhesive disposed therebetween; and a device for irradiating the workpiece with microwave energy to heat the adhesive. The system preferably includes a carrier for supporting the plurality of substrates during the bonding process, preferably in the form of the apparatus for applying pressure to a workpiece as described above; a transport mechanism for moving the carrier to a plurality of stations in the system; an assembly station at which the plurality of substrates having an adhesive between them are assembled into the workpiece; a loading station at which the assembled workpiece is loaded onto said carrier; a pressure application station at which pressure is applied by way of the carrier to hold the workpiece together; and a microwave energy application station at which microwave energy is applied to the workpiece supported in the carrier to bond the substrates together with the adhesive.

The system can further include a cooling station at which the workpiece cools after the application of microwave energy at the microwave energy application station. The transport mechanism preferably includes a conveyer for moving the carrier from the loading station to the pressure application station, and a transfer device for moving the carrier from the conveyer into the microwave energy application station and from the microwave application station to the cooling station. The microwave energy source at the microwave energy application station may irradiate a workpiece with variable frequency microwave energy by sweeping the workpiece with at least one window of microwave frequencies. Each window of microwave frequencies is selected to heat the adhesive essentially without heating the substrates above deformation temperatures thereof.

In a preferred embodiment of the invention, the method and system are used to bond together footwear components such as outsoles, midsoles, and uppers.

BRIEF DESCRIPTION OF THE DRAWINGS

FIGS. 1A–1B illustrate workpieces having multiple substrate layers.

FIG. 6 is a diagrammatic illustration of a system for processing of athletic shoes in accordance with the invention.

FIGS. 7A–7F depict a preferred embodiment of the universal carrier of the invention, wherein:

FIG. 7A is a top plan view of the carrier with its top portion removed;

FIG. 7B is a cross-sectional view and a shoe workpiece in the chamber taken generally along line 7B—7B of FIG. 7A, with a portion removed, illustrating the position of the membranes with a vacuum applied to the diaphragm chamber.

FIG. 7C is the same view as FIG. 7B, illustrating the position of the membranes when no vacuum is applied to the diaphragm chamber and the top of the carrier is pivoted open;

FIG. 7D is an end view of the carrier taken generally along line 7D—7D of FIG. 7A;

FIG. 7E is an enlarged top plan view illustrating a portion of the interior of the carrier; and FIG. 7F is a cross-sectional view of a portion of one of the membranes of the diaphragm chamber, illustrating the raised pattern on one surface thereof.

DETAILED DESCRIPTION OF THE INVENTION

Figure 2:
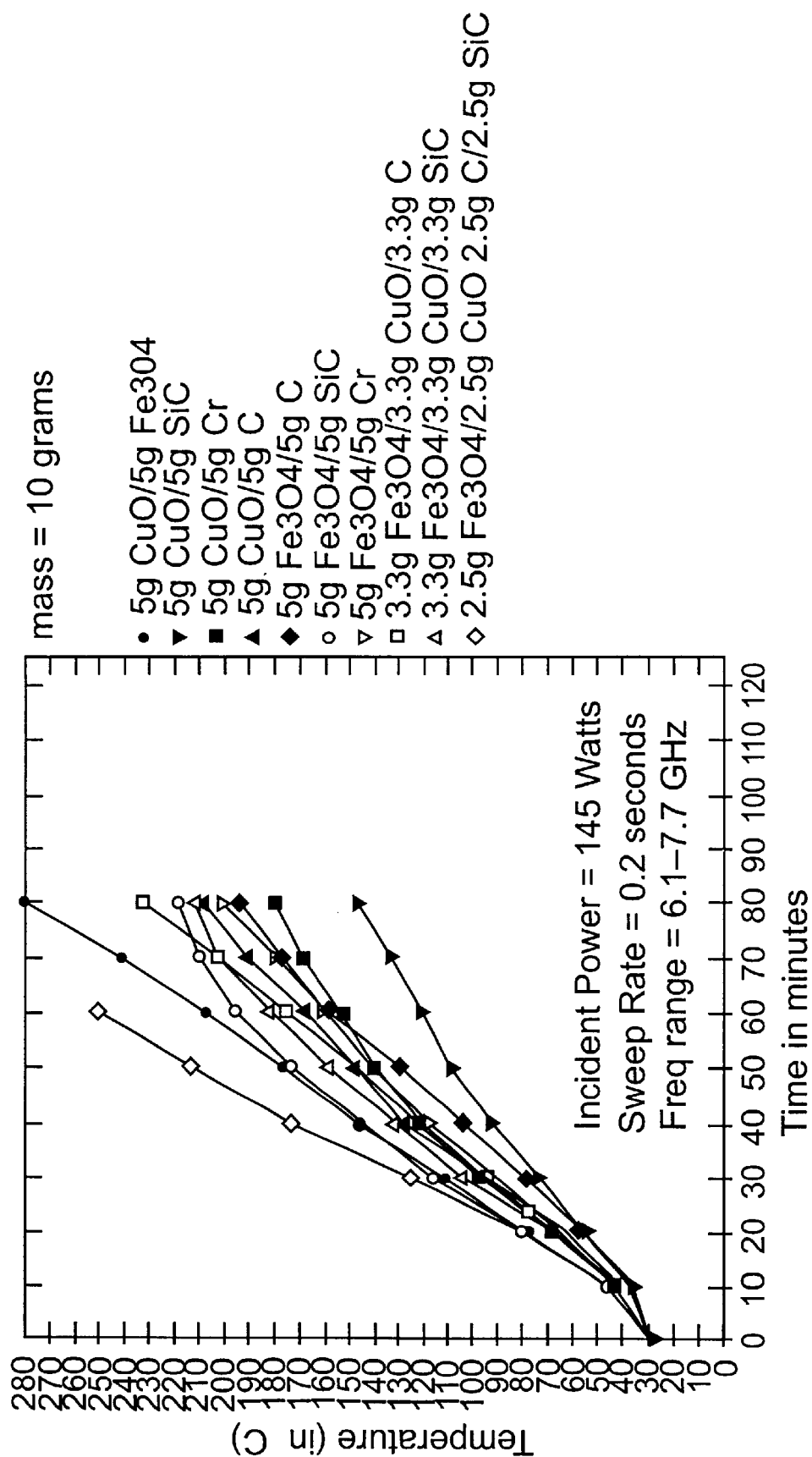
FIG. 2 summarizes the heating rates of various mixtures of candidate adhesive dopants.

The invention is directed to a method for bonding materials having low deformation temperatures using solventless adhesives, and to apparatus with which to practice the method. Although the invention is exemplified herein as it relates to bonding of soles of footwear, the invention is not to be construed so narrowly. Rather, the scope of the invention is as set forth in the appended claims.

For example, the invention is useful in forming laminates suitable for many purposes, such as durable padding comprising a shock-absorbing padding material layer bonded to one or a pair of durable, wear-resistant material surface layers. Such a bonded assembly would be suitable for use as padding in the palm of a glove, for example, or to form bicycle or similar handgrips, or to form wrap-around padding for a bicycle handlebar, or for any shock-absorbing purpose. A durable thermally-insulating container could be made from a laminate comprising thermally insulating material bonded between two durable substrates. A fiber-reinforced laminate for transportation, aeronautical, durable goods, etc., could be made by bonding different polymer matrix composites together. Skilled practitioners recognize that laminates of all sorts could be made in accordance with the invention.

Similarly, the scope of the term "footwear" should not be construed narrowly. Whereas, for convenience throughout the specification, the invention is exemplified as it relates to the soles of shoes, the invention also is applicable to all manner and type of footwear. Thus, the term "footwear" should be interpreted to mean all types of footwear, including, but not limited to, shoes, sandals, boots, oxfords, and skates (e.g., ice skates, roller skates, and in-line skates).

Throughout the specification and claims, the term "workpiece" means any assembly of materials to be bonded, with at least one of the materials having a deformation temperature lower than the activation temperature of the adhesive used to form the bond. Similarly, the term "bonded assembly" means the workpiece after irradiation with energy (e.g., variable frequency microwave energy).

The inventors have discovered that a workpiece comprising material having a deformation temperature lower than the activation temperature of the adhesive used to bond it can be bonded without substantial deformation of that material by irradiation of the workpiece with energy (e.g., variable frequency microwave energy). The frequencies of the energy are selected so as to heat the adhesive preferentially. In this way, the only portion of the material exposed to a temperature greater than the deformation temperature of that material is that portion directly in contact with the adhesive.

The method of the invention is faster than conventional bonding processes. For example, the process of applying the adhesive is faster because, typically, only a single application of the adhesive, particularly if it is a solventless adhesive, is necessary. Solvent-based adhesives typically must be applied a plurality of times to a plurality of surfaces, often with extensive periods between applications, to allow evaporation of the solvent. The time required to form the bond, i.e., to activate a solventless adhesive or to allow the solvent to evaporate from a solvent-based adhesive, is measured in seconds to minutes for solventless adhesive, but in tens of minutes for solvent-based adhesive.

Because it is easier to align substrates in accordance with the invention, the time and effort required to align parts properly is greatly reduced. Also, the alignment achieved often is better than can be achieved when attempting to align substrates to which typically tacky solvent-based adhesive has been applied. The method of the invention makes it easier to ensure correct alignment of complex substrates, such as a workpiece comprising a cushioning element, as shown in FIG. 1. Also, the method of the invention has less waste and mess than known uses of solvent-based adhesive, thus providing a greater proportion of bonded assemblies that need not be cleaned before sale or use.

Because the material having a low deformation temperature is not heated to a high temperature, the method of the invention is relatively energy efficient. The method of the invention also achieves bonds having higher strength than bonds typically achieved with solvent-based adhesives. Because solvents are not released during bonding, a solvent recovery system is not required. Thus, the method also is less expensive to operate than solvent-based systems, and is substantially environmentally unobjectionable.

The environmental friendliness of an embodiment of the method of the invention also extends to another characteristic of materials bonded in accordance with the method of the invention, specifically recyclability. When a thermoplastic adhesive is used, it is a simple matter to recycle a bonded assembly to separately recover the substrate materials by heating the adhesive. The adhesive bond formed by a thermoplastic adhesive can be broken simply by heating the assembly and separating the substrates. Thus, the resultant separately-recovered product streams will be substantially homogeneous rather than a heterogeneous combination of all the parts of the assemblies.

The method of the invention also enables use of a wider variety of materials as substrates with these high performance adhesives. The method of the invention makes it possible to bond material that might not otherwise be suitably bonded thereby, because the material would deform under the conditions necessary to form the bond in accordance with known methods. Also, the method of the invention facilitates bonding of materials difficult to bond when using solvent-based adhesives.

Bonding in accordance with the method of the invention essentially eliminates deformation of a substrate having a deformation temperature below the activation temperature of the adhesive. Preferably, only that portion of the substrate in contact with the heated adhesive is subjected to a temperature above the deformation temperature of that material. In a preferred embodiment, the frequencies of the variable frequency microwaves are selected so that the microwaves pass through the low deformation temperature substrate essentially without the heating substrate. The variable frequency microwaves are absorbed by the adhesive thereby heating the adhesive. As a result, microwaves will activate and heat the adhesive in a short period. Only at the interface, will the temperature of the substrate exceed the deformation temperature thereof. This permits the substrate to maintain its shape and its integrity because this surface is heated to the activation temperature for a short period. Preferably, the substrate is cooled after heating and activation, while pressure remains applied to the workpiece, to minimize deformation of the substrate. Cooling can include quenching with a cooled gas, i.e., cooled air or other similar cooling methods, the selection of which is within the skill of one in the art.

The method of the invention thus solves the problem of using an adhesive that must be activated, i.e., heated to a temperature at which the adhesive forms the desired bond, to bond material that has a deformation temperature lower than the activation temperature of the adhesive. The method of the invention makes it possible to use solventless adhesives to bond substrate material, having a deformation temperature lower than the activation temperature of the adhesive essentially without deforming that substrate.

Thus, it should be noted that the method of the invention does not require that each substrate have a deformation temperature lower than the activation temperature of the adhesive. Rather, the method of the invention suitably is used when only one of the substrate materials satisfies the temperature relationship.

As stated above, although the use of other energies is contemplated, the use of variable frequency microwaves is preferred. Skilled practitioners recognize that microwave processing is more energy efficient than conventional thermal processing because the microwave (electromagnetic) energy is directly coupled into the material at the molecular level, bypassing the air in the cavity chamber. In accordance with a preferred embodiment of the invention, the low deformation temperature material also is substantially transparent to microwave energy, thus further improving the heating efficiency.

Heat is generated in materials irradiated with microwaves in accordance with orientation polarization or equivalent resistance heating. The operative mechanism may be dependent upon the operating frequency. Orientation polarization is perhaps the most important mechanism of polarization in the microwave frequency range. Equivalent resistance heating results from the flow of conductive current in the substance. The current is related to electronic conduction and ionic conduction in a material. Equivalent resistance heating is more significant at lower frequencies.

Also known as dipolar polarization, orientation polarization involves the perturbation of the random motion of ionic or molecular dipoles to produce a net dipolar orientation under the direction of an applied electric field. Orientation polarization depends on the internal structure of the molecules and on the molecular arrangement of the structure of the dielectric substance, i.e., the adhesive or substrate. Thus, each material exhibits a specific dielectric behavior (losses) which is dependent upon the range of temperatures and frequencies used during processing. Dielectric loss measurements of a given material over the range of temperatures and frequencies of interest provides the information necessary to select frequencies and to select those frequencies which optimize heating of that material. For most polymeric materials, the orientation polarization loss peak (maximum loss) shifts to higher frequencies as the temperature of the material is increased.

In accordance with the method of the invention, a workpiece is formed, then irradiated with variable frequency microwave energy under conditions sufficient to form a bonded assembly. The workpiece can comprise any combination of substrates, at least one substrate having a deformation temperature lower than the activation temperature of the adhesive, and adhesives which will form a bonded assembly upon irradiation with variable frequency microwave energy. A plurality of adhesives may be used; the substrates need not be the same composition of matter.

The most simple bonded assembly comprises a layer of adhesive between two substrates. A workpiece may comprise more than two substrates, and the substrates need not be co-extensive. In FIGS. 1A and 1B, the workpiece is illustrated as an assembly of substrates forming a sole structure. The sole structure has a substrate E (a fluid filled bladder) that is partially or totally encapsulated between and surrounded by other substrates T (a foam midsole) and B (an outsole), as illustrated in FIGS. 1A and 1B, respectively. Such an encapsulated substrate need not be adhered to either encapsulating substrate.

As set forth herein, the method of the invention is directed to bonding of material having a deformation temperature lower than the activation temperature of the adhesive used to form the bond. Therefore, any thermoplastic or thermoset adhesive that generally satisfies the temperature relationship described herein would be suitable for use in the method of the invention. The activation temperature of a thermoplastic adhesive is the temperature at which the adhesive melts or softens to a degree sufficient to use it as an adhesive. The activation temperature of a thermoset adhesive is that temperature at which the curing reaction occurs and the adhesive becomes essentially completely cured.

A workpiece can be formed by any known method. For example, a workpiece can be assembled by hand or by machine. Fluid thermoplastic adhesive and fluid reactant components of a thermoset adhesive can be applied by dip, spray, roller, doctor blade, or any other manner. A piece of solid thermoplastic adhesive can be interposed between substrates. Such a piece would soften during processing and conform to the shape of the substrates. Skilled practitioners are familiar with methods for applying adhesive and assembling a workpiece.

Solventless adhesives (such as hot melt adhesives) have been used in shoe manufacturing when only high deformation temperature materials, such as rubber and leather, were used as substrates. Because these substrates have deformation temperatures higher than the activation temperature of the adhesive, they do not deform during bonding in accordance with known methods. However, solventless adhesives have not been used in athletic shoe manufacturing because midsoles are made from ethylene vinyl acetate (EVA) foam, which deforms at a temperature of about 80° C., and similar materials that have relatively low deformation temperatures. EVA foams have, and other low deformation temperature materials may have, low loss factors that make them transparent to microwaves. Thus, use of the method of the invention makes possible the bonding of ethylene vinyl acetate or similar midsole materials to rubber or similar material used as outsoles with high performance adhesive.

In accordance with the method of the invention, an energy, preferably variable frequency microwave energy, is applied to the workpiece. Variable frequency microwaves at frequencies selected to be absorbed by the adhesive rapidly, and to uniformly cure the thermoset adhesive or soften the thermoplastic adhesive without adversely affecting the components being bonded together.

A particularly preferred variable frequency microwave furnace is described in U.S. Pat. No. 5,321,222, to Bible et al., the disclosure of which is incorporated herein by reference in its entirety. A variable frequency microwave furnace typically includes a microwave signal generator or microwave voltage-controlled oscillator for generating a low-power microwave signal for input to the microwave furnace. A first amplifier may be provided to amplify the magnitude of the signal output from the microwave signal generator or the microwave voltage-controlled oscillator. A second amplifier is provided for processing the signal output by the first amplifier. A power supply is provided for operation of the second amplifier. A directional coupler is provided for detecting the direction of a signal and further directing the signal depending on the detected direction. Preferably, a high-power broadband amplifier, such as but not limited to a traveling wave tube (TWT), a tunable magnetron, a tunable klystron, a tunable twystron, and a tunable gyrotron, is used to sweep a range of frequencies of up to an octave in bandwidth spanning the 300 MHZ to 300 GHz frequency range.

Appropriate use of variable frequency processing, as disclosed herein, enhances uniformity of processing of workpieces because placement of the workpiece within the microwave furnace is not critical. By contrast, with single frequency microwave processing, each workpiece to be bonded must be oriented precisely the same way and placed in precisely in the same position in the microwave oven to achieve identical processing time and quality. Another advantage of using variable frequency microwave processing as disclosed herein is a reduction of thermal deformation of the substrates. By selecting frequencies and powers that cure or soften a particular adhesive essentially without causing excessive heating of the substrates, deformation and other heat-related damage is avoided.

The practical range of frequencies within the electromagnetic spectrum from which microwave frequencies may be chosen is about 0.90 GHz to 40 GHz. Every workpiece irradiated with microwave energy typically has at least one bandwidth, or window of frequencies within this overall range, that will cure or soften the adhesive without damaging the substrates. The term "window," as used herein, refers to a range of microwave frequencies bounded on one end by a specific frequency and bounded on the opposite end by a different specific frequency. Outside a particular window of damage-free frequencies, substrates may become deformed or otherwise damaged. A window may vary, depending on the component configuration, geometry, and composition of both substrates and adhesives. A workpiece may have a plurality of such windows. With the information set forth herein, a skilled practitioner will be able to select damage-free windows for a particular workpiece, whether empirically, through trial and error, or theoretically, using power reflection curves and the like.

Within a window of damage-free frequencies for a particular workpiece, it generally is preferred to select those frequencies that result in the shortest processing time. Typically, the time required to form the bond is set by the time required to cure a thermoset adhesive or to soften a thermoplastic adhesive. Preferably, a workpiece is processed with a subset of frequencies from the upper end of each window. More modes can be excited with higher frequencies than with lower frequencies. Therefore, better uniformity in processing typically is achieved. Additionally, at the higher frequency, more microwave energy is imparted to the workpiece, and energy absorption depth is more shallow. Greater microwave energy absorption and lesser microwave penetration depth result in shorter processing time. However, any subset of frequencies within a window of damage-free frequencies may be used.

Many workpieces irradiated with microwave energy have multiple windows of frequencies within which a thermoset adhesive will cure or a thermoplastic resin will soften without causing damage to the substrates. For example, a particular workpiece may be irradiated with microwave energy without damage at frequencies between 3.50 GHz and 6.0 GHz, and also may be irradiated without damage between 7.0 GHz and 10.0 GHz. The availability of additional windows provides additional flexibility for achieving rapid, yet damage-free bonding. Complex geometrical configurations and material combinations may shrink or close a window of processing frequencies otherwise available. The availability of alternative windows permits bonding of a workpiece using microwave irradiation without having to resort to other curing methods.

Preferably, the step of curing or softening is performed by "sweeping" the workpiece with variable frequencies from within a particular window of damage-free frequencies. The term "sweeping," as used herein, refers to irradiating the workpiece, i.e., the adhesive(s) and the substrates, with many of the frequencies within a particular window. Frequency sweeping results in uniformity of heating because many more complementary cavity modes can be excited. The uniformity in processing afforded by frequency sweeping provides flexibility in how groups of components to be bonded are oriented within the microwave furnace. Therefore, it is not necessary to maintain each workpiece in precisely the same orientation.

Sweeping may be accomplished by launching the different frequencies, either simultaneously or sequentially, within a window. For example, for a window of damage-free frequencies of from 2.60 GHz to 7.0 GHz, frequency sweeping involves continuously and/or selectively launching frequencies within this range in any desirable increments. Thus, moving from 2.6 to 3.3 GHz in increments of 0.0001 GHz would be acceptable. Indeed, virtually any incremental launching pattern may be used.

The rate at which the selected frequencies are launched is referred to as the sweeping rate. This rate may be any time value, including, but not limited to, milliseconds, seconds, and minutes. Typically, the sweep rate is up to 1 second, preferably is up to 0.5 seconds, and more preferably is between about 0.1 and 0.3 seconds when processing athletic shoe soles. Preferably, the sweep rate is as rapid as practical for the particular workpiece being processed.

The method of the invention is particularly useful in forming a bonded assembly comprising a midsole and an outsole. As described above, additional features also may be present in the assembly. In particular, athletic shoes may have a shock absorbing cushion incorporated between the midsole and the outsole. Such a cushion may comprise any known type of shock absorbing material. A preferred cushion comprises a pressurized, typically sealed, flexible pouch or envelope. The cushion contains fluid, typically gas, in a quantity and at a pressure sufficient to provide a cushioning effect. This flexible pouch or envelope often is made of a urethane polymer, although any material able to maintain the desired cushioning effect can be used. A shoe also may have a shank, a relatively rigid member, which serves to stiffen the shoe and provide support for the foot. Typically, shanks are made from steel, nylon, and other relatively rigid materials.

Midsoles preferably are flexible and lightweight. Importantly, a midsole should cushion the wearer's foot comfortably while providing support for the foot. Materials having a good balance of these desirable characteristics include ethylene vinyl acetate foam, polyurethane foam, and similar cushioning materials.

Outsoles must be tough, to withstand the repeated impact and abrasive sliding contact with the ground. They must provide traction for the wearer. Outsoles must be sufficiently flexible so as to be comfortable and accommodate small debris, such as small stones, sticks, and the like on the ground, yet resistant to abrasion, puncture damage, and other damage caused by objects and chemicals, such as oil, upon which the wearer might alight. The weight of the outsole preferably is minimnized. Suitable material from which outsoles may be made include butyl rubber, nitrile rubber, nitrile butyl rubber, neoprene rubber, styrene butadiene rubber, and blends thereof.

As set forth above, the adhesive must be selected to achieve a good bond. An appropriate adhesive is compatible with at least one, and preferably all, of the substrates, thus providing a bond of sufficient quality. Of course, it is always necessary to ensure that the substrates are in sufficiently intimate contact with the adhesive. Further, the surface of the substrate can be modified to yield a surface having improved compatibility with a high performance adhesive.

Depending on the type of adhesive, bonding can be based on chemical bonds, acid-base interactions, adsorption, and mechanical interlocking. Chemical bonding yields the strongest bonds, but requires appropriate chemical reactivities on the surface of the substrate. For example, rubber outsoles can be intentionally under-cured and the functional groups on the surface chemically bonded to adhesive. Acid-base interaction forms the second best bonds. The acid-base interaction principle is that dipoles in a condensed medium will not attract each other unless one is basic (electron donor) and other is acidic (electron acceptor). Thus, for bonding applications, polarity defined in terms of dipole moment is not important, but polarity defined in terms of acid or base is important. In general, adsorption and mechanical interlocking mechanisms become unimportant when an acid-base interaction is present.

As with any bond, the surfaces of the substrates must be clean and free of debris. However, some clean substrates are difficult to bond. For example, generally, SBR (styrene butadiene rubber) rubbers are very difficult to bond using hot melt (thermoplastic) adhesive without priming. Priming, a surface treatment, typically requires use of an organic solvent. A layer of neoprene coated on SBR rubber substrate serves to improve bondability. However, an EVA surface is basic, whereas a neoprene surface is acidic. To bond EVA to neoprene, therefore, a hot melt adhesive, or a combination of adhesives, having both characteristics, such as hot melt adhesives based on ethylene and acrylic acid copolymers, is needed. Both Dupont Elvax (ethylene/vinyl acetate/acid terpolymer) and Henkel Q5355s (carbon doped polypropylene) hot melt adhesives can, in accordance with the invention, achieve good bonding between EVA and neoprene, with peel strength higher than 3.5 kg/cm. Both hot melt adhesives have bonding temperatures higher than 80° C. and therefore cannot be used to bond EVA to neoprene if the process requires heating of the entirety of the substrates. However, in accordance with the method of the invention, energy is focused on the adhesive. Therefore, when the adhesive temperature reaches the activation temperature, the adjacent layers of the substrates, e.g, EVA and neoprene, also are raised to the activation temperature. However, maintenance of uniform pressure at an appropriate level resists the tendency of the EVA substrate, indeed, of any low deformation temperature substrate, to deform. Quenching the bonded assembly after bonding also serves to minimize deformation of the low deformation temperature substrates.

High performance solventless adhesives include both thermoplastic and thermoset adhesives. Thermoplastic adhesives include those that are based on thermoplastic polymers such as polyolefins, vinyl polymers, polycarbonates, polyamides, polystyrenes, polyetherimides, polyarylene sulfones, polyphenylene sulfides, polyphenylene oxides, polyethersulfones, polyetherether ketones and blends and copolymers thereof. Thermoset adhesives include those based on thermoset polymers such as epoxies, phenol formaldehydes, urea-formaldehydes, melamine formaldehydes, polyesters, polyurethanes, cyanate esters, polybutadienes, alkyals, polyimides, amino resins and silicones and blends and copolymers thereof. The following adhesives have been identified as suitable: duPont Elvax, an ethylene/vinyl acetate/acid terpolymer; Henkel Q5355s, a carbon-doped polypropylene; H. B. Fuller HL6472, a polyester-based thermoplastic; Bemis C5251, a carbon-filled polyester; Bemis 5251, an unfilled polyester; Bemis 6218, a polyolefin; and Henkel TPX16-206B, a polyamide-based thermoplastic. These adhesives may contain any of the commonly-employed additives, such as but not limited to fillers, colorants, curing agents, pigments, and thickening agents.

In particular, adhesives may contain a microwave susceptible material (i.e., a dopant) which would serve to increase the susceptibility of adhesive to microwaves. Indeed, a polypropylene based adhesive would require dopants, as polypropylene is essentially transparent to microwave energy. Dopants can be incorporated with adhesive by way of chemical bond or physical mixing. Chemical dopants are incorporated into adhesive's molecular structure and can be either a strong dipole or electron acceptor, such as I, $AsF_6$, or $ClO_4$, or an electron donor, such as Li, Na, or K. Physical dopants are usually conductive materials that are mixed within the adhesive. The quantity of dopant required for optimum microwave heating efficiency depends on the physical properties of the dopant, such as the conductivity and the particle size and shape.

Preferably, the thermoplastic or thermoset polymer includes a mixture of a first microwave susceptible component and a second microwave susceptible component, such as described in a utility patent application entitled "Microwave Curable Adhesive," filed Nov. 6, 1997, and naming Zakaryae Fathi and Jianghua Wei as inventors, the disclosure of which is incorporated herein in its entirety. The first microwave susceptible component and second microwave susceptible component have a preselected size, shape, and conductivity to provide a multimodal distribution of components and to maximize microwave adsorption. A preferred mixture of microwave susceptible components comprises first carbon fibers having a diameter of about 0.01 to about 1 $\mu$m, a length of about 10 to about 300 $\mu$m, and a conductivity of about $10^{-2}$ to about $10^{-7}$ $\Omega$/cm, and second carbon fibers having a diameter of about 1 to about 20 $\mu$m, a length of about 50 to about 600 $\mu$m, and a conductivity of about $10^{-2}$ to about $10^{-7}$ $\Omega$/cm.

FIG. 2 summarizes the heating rates of 10 gram mixtures of candidate dopants (CuO, $Fe_3O_4$, SiC, Cr, and C) irradiated with microwave energy at a power of 145 W, a frequency range from 6.1 to 7.7 GHz, and a sweep rate of 0.2 seconds. The differences in heating rates illustrated in FIG. 2 are caused by the differences in conductivity of the materials and the interfacial polarization among various components thereof.

Figure 3:
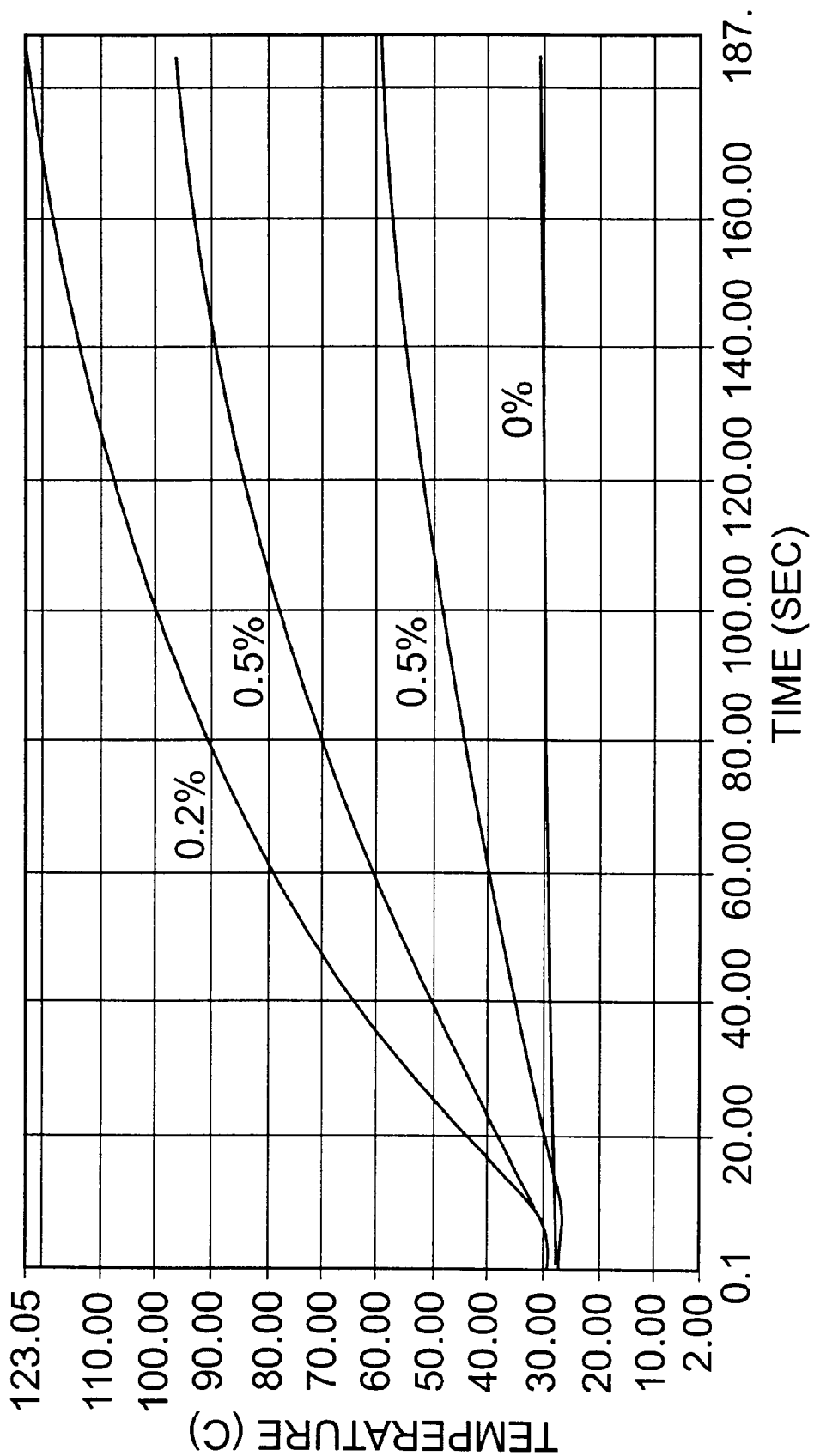
FIG. 3 summarizes the heating rates of a hot melt adhesive undoped and doped with carbon fibers at selected concentrations.

The quantity of dopant has a significant effect on the heating efficiency enhancement. FIG. 3 shows heating rates of 4 grams of Henkel Q5353 hot melt adhesive (polypropylene based) doped with 0%, 0.05%, 0.2%, and 0.5% by weight of micron-sized carbon fibers (Vapor-grown carbon fiber Pyrograf-III™ manufactured by Applied Science, Inc.). The power was 100 W and the frequencies ranged from 6.75 to 7.25 GHz with a sweep rate of 0.2 seconds. Because polypropylene is essentially transparent to microwaves, there is essentially no heating of undoped Q5353 polypropylene based adhesive, as can be seen in FIG. 3. With 0.05 wt % of carbon fibers added to Q5353 adhesive, the heating rate is substantially increased. With 0.2 wt % of carbon fibers added to the Q5353 adhesive, the heating rate is increased even further. However, with 0.5 wt % of carbon fibers added to the Q5353 adhesive, the heating rate is decreased to a level intermediate of the 0.05 and 0.2 wt % results. Clearly, too large a quantity of dopant is not necessary and may be counterproductive.

The various dopants add different colors to adhesives. For example, adhesive doped with carbon black (C) or silicon carbide (SiC) is black. Adhesive doped with silver (Ag), aluminum silicate ($Al_2O_5Si$), or lithium silicate ($Li_2O \cdot 2SiO_2$) is white to grayish.

Also, the shape of the dopant material may have an effect on microwave heating enhancement. For example, dopants in the form of fibers typically are more effective dopants. Fiber form dopants can form an interconnecting matrix within the adhesive at a very low concentration. Upon microwave irradiation, the equivalent resistance heating within the dopant matrix upon microwave irradiation is significant and results in fast heating rates. Powder form dopants cannot form an interconnecting matrix as effectively as fibers. Thus, without the interconnecting dopant matrix, the equivalent resistance heating is much less significant, as manifested by the significantly lower enhancement of heating rate.

Figure 4:
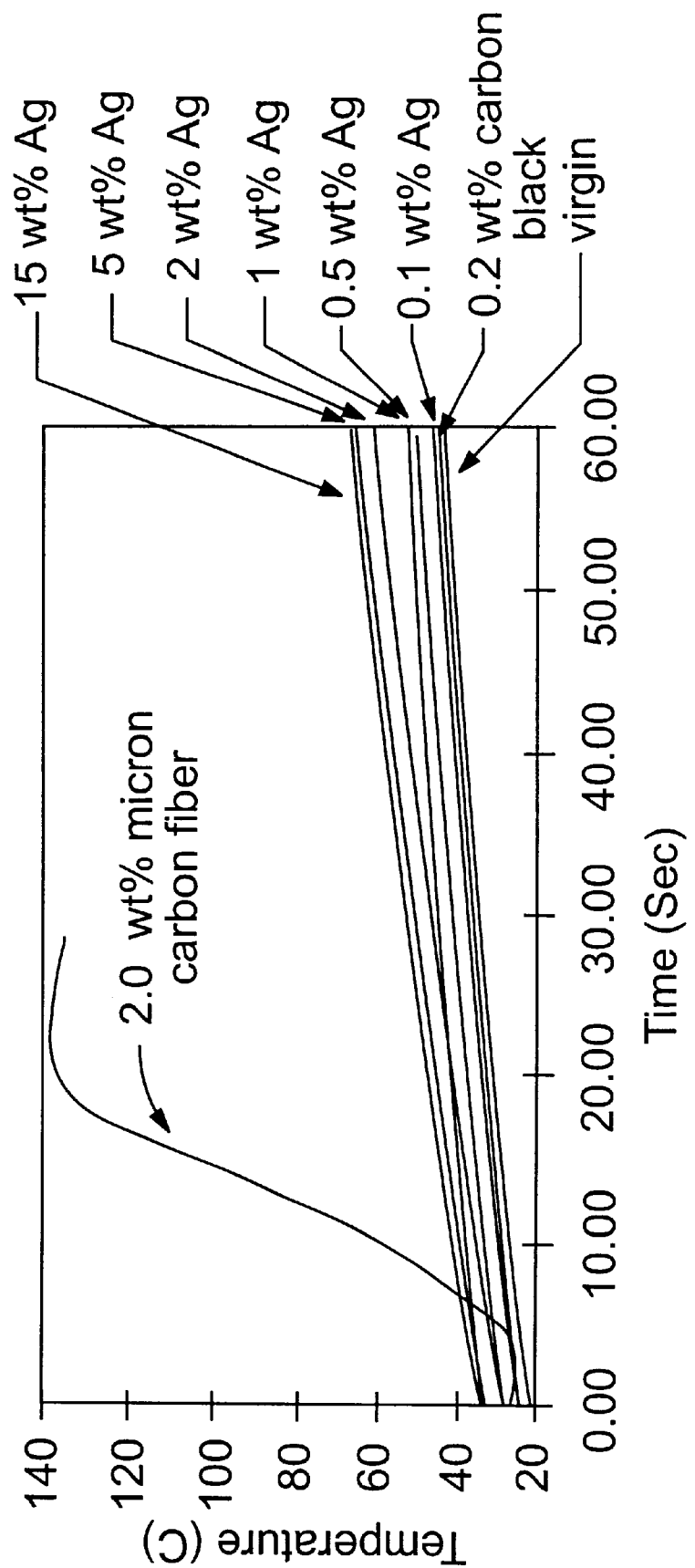
FIG. 4 summarizes the heating rates of a different hot melt adhesive undoped and doped with candidate dopants in powder and fiber forms.

A difference in the effectiveness caused by the difference in shape between two dopants comprising the same composition of matter, and of the relative ineffectiveness of a metal dopant in powder form, is illustrated in the data summarized in FIG. 4.

The effectiveness of powder form silver (Ag), of powder form carbon (C), and of fiber form carbon (C) as dopant for a thermosetting adhesive (Johnson Matthey's Expresin) was determined. Microwave heating rates of 2 grams of each doped adhesive were measured, as set forth in FIG. 4. As shown in FIG. 4, powdered silver is not an effective dopant for enhancing microwave heating rates at concentrations from 0.1 wt % to 15 wt %. Also, the effect of 0.2 wt % of carbon powder was not significant. However, 0.2 wt % micron-sized carbon fibers dramatically enhanced the heating rate.

Figure 5:
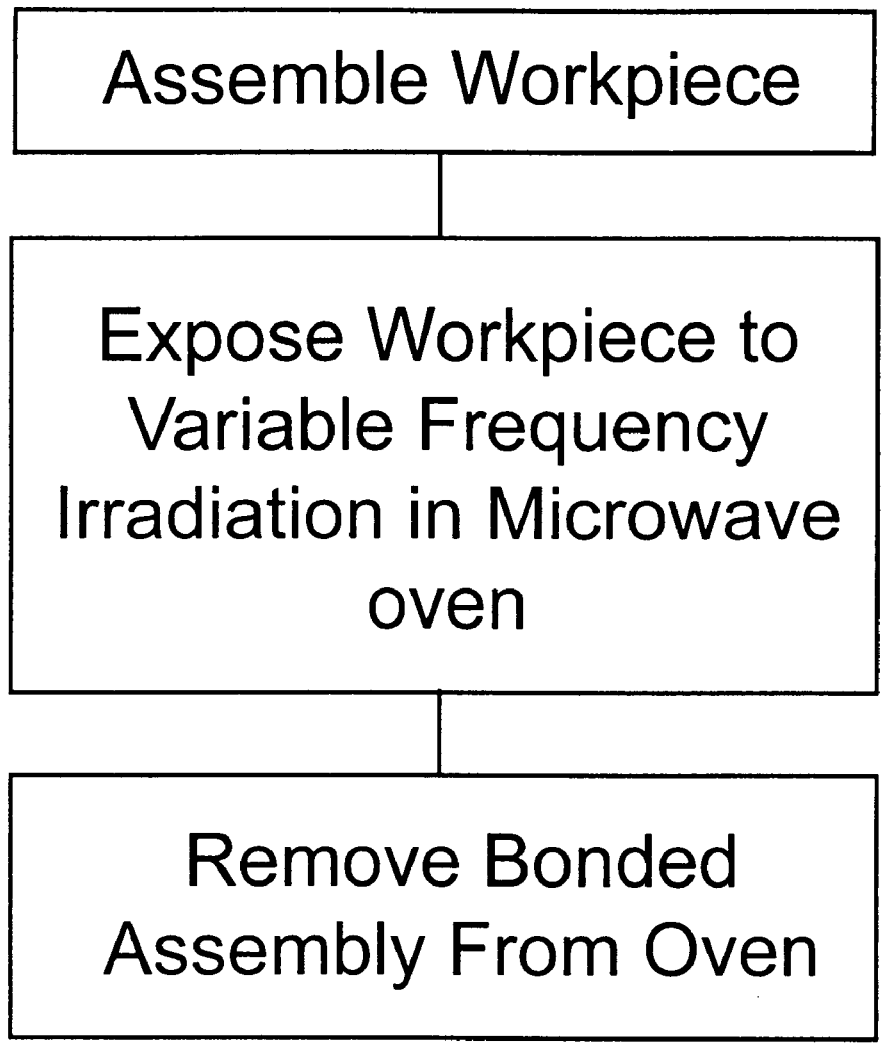
FIG. 5 is a flow chart for processing workpieces in accordance with the invention.

A flow chart for processing workpieces in accordance with the method of the invention is set forth in FIG. 5. As illustrated in FIG. 5, the workpiece is assembled, then exposed to variable frequency microwave irradiation in a microwave oven or furnace. The now-bonded assembly is removed from the microwave oven. Specific details, such as whether adhesive is applied by spray, roller, doctor blade, or by dipping a substrate into adhesive, are not illustrated. Optional or discretionary steps, such as application of pressure to the workpiece or cooling thereof after bonding, also are not illustrated in the schematic FIG. 5.

As described above, the workpiece can have more than two substrates, can be assembled in any order, and adhesive can be applied to any substrate in any known matter. Indeed, it may be appropriate to apply adhesive to both substrates, or to each of more than two substrates. A different adhesive can be applied to each substrate. The workpiece can be assembled in the carrier. Skilled practitioners recognize that the order of assembly of the workpiece can be arranged in any manner.

Heating of a substrate/adhesive assembly before the workpiece is completed and irradiated with variable frequency microwave energy is not required in practicing the method of the invention. The purpose of this heating stage is to ensure that the adhesive is tacky and will hold the workpiece together temporarily as it is further processed. If the adhesive is a thermoplastic composition, heating ensures that the adhesive remains sufficiently fluid so as not to interfere with assembly of the workpiece. If the adhesive is a thermoset composition, heating may advance the curing reaction, but should not be afforded the opportunity to cure the adhesive before the bonded assembly is complete. Without regard to the type of adhesive, heating raises the temperature of the adhesive so that the period of irradiation by microwave is minimized. The heating does no damage to the substrate heated, as such heating is carried out only when the substrate involved is not temperature-sensitive, i.e., has a deformation temperature above, and preferably well above, the activation temperature of the adhesive. A shorter period of microwave irradiation reduces the risk that a substrate having a low deformation temperature will be overheated.

When one of the substrates is an outsole, it typically is formed from material that does not have a low deformation temperature, as that phrase is defined herein. Therefore, because such an outsole can tolerate a higher temperature than can a typical midsole material, i.e., a material having a low deformation temperature, without risking ruination of the substrate, it is advantageous to raise the temperature of such an outsole/adhesive assembly. In any event, this heating of the substrate/adhesive combination can be done in any manner and under conditions that will raise the temperature of the adhesive without raising the temperature of a substrate beyond its deformation temperature. Skilled practitioners can, with the guidance provided herein select suitable heating apparatus, whether microwave, and infrared, or hot air, and determine appropriate duration, of such heating.

In any bonding process, an adequate amount of pressure is needed during bonding to achieve a good bond. It is relatively easy to provide uniform pressure to a flat workpiece. For bonding of complex shapes, such as shoe soles or shoe upper, however, a mold may be required to apply uniform pressure to the workpiece. However, a hard mold shaped to match each particular workpiece will be not only hard to handle but also will be very costly for processing workpieces of differing sizes and shapes.

Appropriate pressure is applied to the workpiece during bonding. Whereas pressure may not be required to form a suitable bond, pressure often is required to ensure complete contact between all parts of the workpiece during the bonding process. The level of such pressure depends upon the characteristics of the workpiece, such as the relative stiffness of the substrates, the closeness of fit therebetween, the viscosity of the adhesives, and other relevant factors.

Application of pressure also may aid in resisting the tendency of some substrates, such as low-density ethylene vinyl acetate foam often used to form a shoe midsole, to deform at temperatures at or below the activation temperature of the adhesive. Although practice of the method of the invention minimizes the temperature of a substrate having a low deformation temperature during bonding, at least a portion of the substrate, i.e., that part in direct contact with the adhesive, will experience a temperature above the deformation temperature. However, it may be possible to ameliorate selected modes of deformation, such as warping, by application of pressure sufficient to resist the deformation.

The pressure sufficient to prevent deformation depends upon the characteristics of the workpiece, including in particular the manner in which the substrate deforms and the strength of its tendency so to do. For example, pressure may prevent warping, but it is not likely to prevent melting. Typically, for materials used to form outsoles and midsoles, this pressure will not exceed the pressure necessary to ensure complete bonding. For example, a typical outsole can be formed from a neoprene rubber, and a typical midsole can be formed from an ethylene vinyl acetate foam, with the pressure being in the range of 28 to 32 psi. With the guidance provided herein, a skilled practitioner will be able to determine the pressure level necessary to prevent undesired deformation. Typically, pressure is applied after the workpiece is completely assembled. In a workpiece comprising more than two substrates, it may be appropriate to apply pressure after two substrates have been mated. Then, the pressure is released to enable continued assembly. Pressure then is reestablished after complete assembly of the workpiece.

Typically, pressure is applied from after the time the workpiece is assembled, until after the irradiation with microwaves and the temperature of a substrate having a relatively low deformation temperature is below the temperature at which deformation is likely to occur. Then, the pressure is released. Pressure can be exerted for a shorter time, for example, only during irradiation with microwave energy, for those workpieces that are not likely to deform as a result of the practice of the invention.

Skilled practitioners recognize that the pressure applied to the workpiece depends upon the vacuum level. If pressure from vacuum is not sufficient, a pressurized chamber can be used to provide additional pressure on the workpiece.

FIG. 6 diagrammatically illustrates a system for performing a bonding process on athletic shoes, in particular shoe soles, in accordance with the invention. As illustrated in FIG. 6, a workpiece 10 is assembled by first applying solventless adhesive on an outsole 12, at an adhesive application station 14. The adhesive can be applied in any manner. However, spraying a uniform layer of adhesive on the outsole is the preferred technique. The outsole/adhesive assembly 12 may be heated in furnace (not shown).

When a complete shoe assembly is being bonded, i.e., an outsole 12, midsole 16, and upper 17, as illustrated in FIG. 7B, both outsole 12 and a midsole 16 are sprayed with an adhesive at the adhesive application station 14. At an assembly station 18, outsole 12 and midsole 16 are assembled together, and an upper 17, which is stored at the assembly station, is placed on the midsole surface to which the adhesive had been applied. The workpiece 10 formed of outsole 12, midsole 16, and upper 17, is then placed on a carrier 50 at a loading station 20.

When only an outsole 12 is to be bonded to a midsole 16, only outsole 12 needs to be sprayed with an adhesive and midsole 16 can be stored at assembly station 18. Midsole 16 then is placed on an outsole 12 at assembly station 18, and the now-complete workpiece 10 is placed in a carrier 50 at loading station 20.

A transport mechanism 22, which includes a conveyer 24 and a transfer device 26 moves carrier 50 with the workpieces 10 through stations of the bonding system. Conveyer 24 can be any conventional conveyer, such as a Bosch continuous belt conveyer. Conveyer 24 is continuously driven with conventional pneumatically driven stop devices located at processing stations to hold carrier 50 in position during processing. Transfer device 26 is preferably a robotic arm 29, such as a Staubli RX-170 robot.

A pair of workpieces 10 are placed on a single carrier 50 at loading station 20 and carrier 50 is closed. The assembly of the workpieces and their placement on carrier 50 can be done manually. After assembly, the stop at the loading station is released, and conveyer 24 moves the loaded carrier 50 to a pressure application station 27. A stop device stops carrier 50 at pressure application station 27 and carrier 50 is coupled to a conventional vacuum source, such as a Piaab vacuum generator. As will be explained in detail later with reference to FIGS. 7A through 7F, a vacuum is applied to a chamber defined by flexible diaphragms of the carrier in a manner that pressure is applied to workpieces 10 on carrier 50. After the vacuum is drawn and the pressure is applied, the vacuum source is uncoupled from carrier 50 and the chamber is sealed so that the pressure remains on workpieces 10 during further processing.

The stop device at pressure application station 27 releases carrier 50, and conveyer 24 moves carrier 50 with the secured workpieces 10 to a microwave energy application station 28 where another stop device stops carrier 50 adjacent a microwave oven 30. Robotic arm 29 then transfers carrier 50 from conveyer 24 into microwave oven 30. Workpieces 10 are irradiated with variable frequency microwave energy to form bonded workpieces. Robotic arm 29 then removes carrier 50, with the bonded workpieces 10, from microwave oven 30, and places them on a cooling rack 32 at a cooling station 34. Cooling rack 32 is a conventional open cooling rack which has a plurality of support flanges along its sides for supporting a plurality of carriers 50 in a spaced apart relationship.

After the bonded workpieces 10 have cooled a sufficient degree, for example to 30 to 35° C., robotic arm 29 transfers the cooled carrier 50 onto conveyer 24 adjacent a pressure relief station 36, where it is held in position by a stop device. A source of pressurized air is coupled to carrier 50 at pressure relief station 36 in order to relieve the vacuum in the chamber and, thus, release the pressure on the bonded workpieces 10. The stop device releases carrier 50, and conveyer 24 moves carrier 50 away from pressure relief station 36 for subsequent processing. The subsequent processing can simply be opening the carrier 50 and unloading the bonded workpieces 10, or conveying the carrier 50 and bonded workpieces 10 on another conveyer 38 to subsequent processing stations. Control of the stop devices, the vacuum and pressure applications, the microwave oven, and the robotic arm are accomplished by conventional computer controls, which can be readily set by skilled practitioners.

Figure 7A:
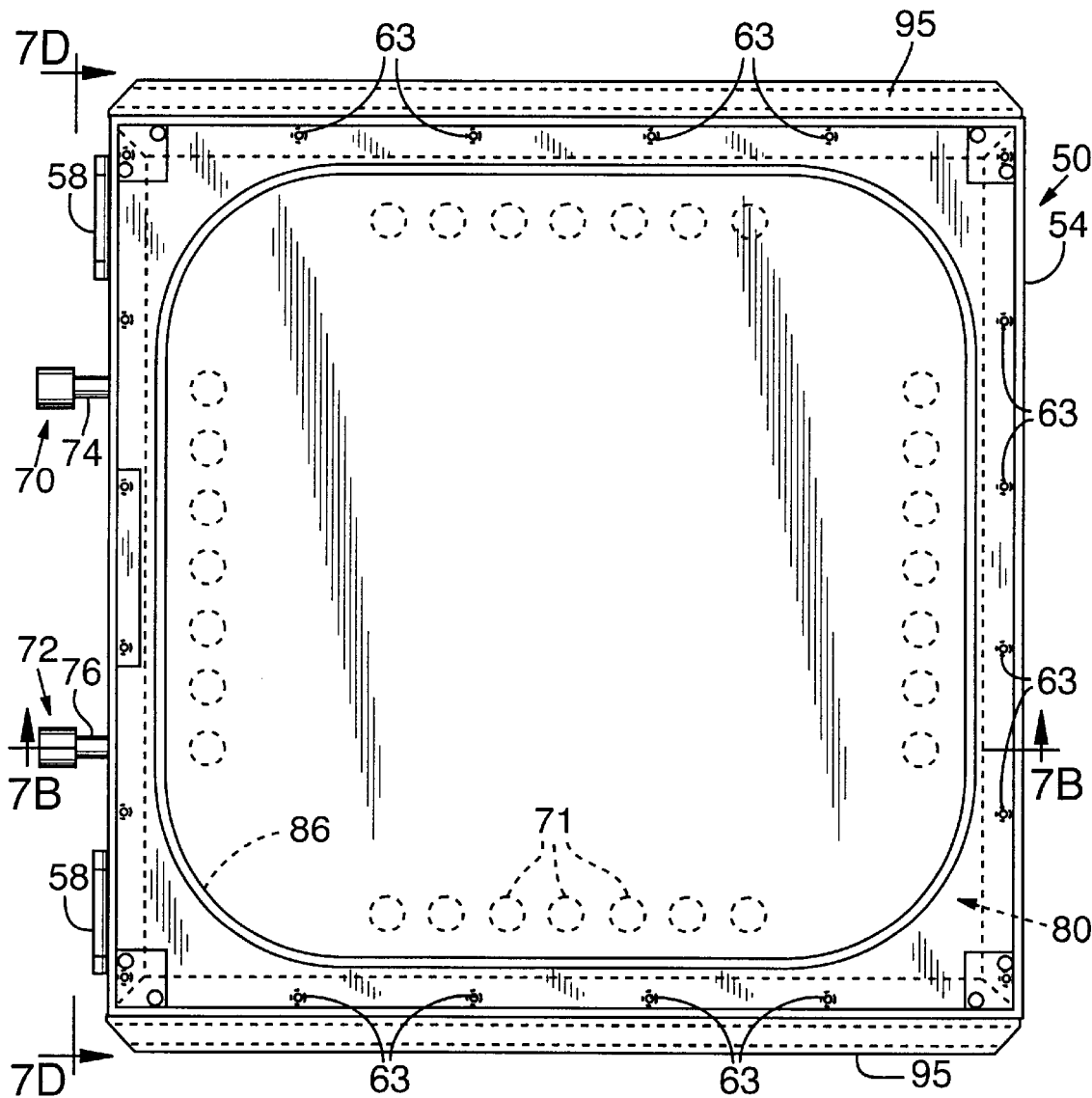
Figure 7D:
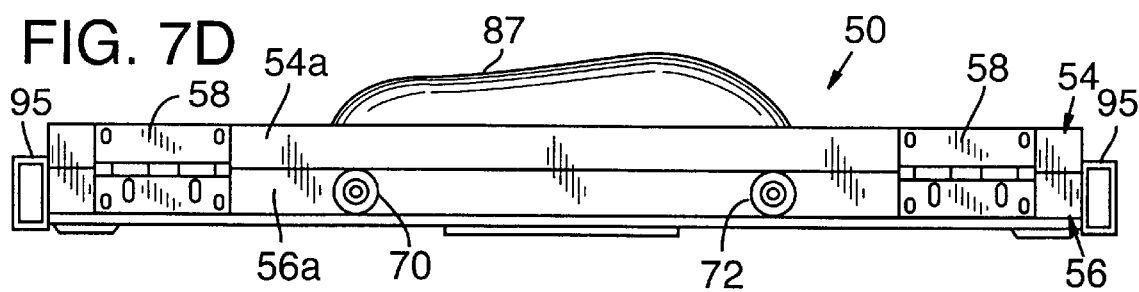

Referring now to FIGS. 7A–7F, a preferred carrier 50 for processing workpieces in accordance with aspects of the present invention is illustrated. The illustrated carrier 50 includes a diaphragm assembly 80 formed of an upper diaphragm membrane 82 and a lower diaphragm membrane 84, which are sandwiched between rectangular top and bottom portions 54 and 56, respectively. Preferably the diaphragms are transparent to microwave energy. For example, silicone rubber is preferred as a diaphragm material. The top and bottom portions 54 and 56 are pivotally connected along adjacent edge portions 54a and 56a, respectively, via a pair of hinges 58 (FIG. 7D). When in operation, the top portion 54 overlies the bottom portion 56 as illustrated in FIG. 7B.

Referring now to FIGS. 7B and 7C, peripheral portions of the carrier 50 are illustrated in greater detail. The top portion 54 of the carrier 50 includes a top frame 60 and a top clamp plate 62, which extend around the perimeter of top portion 54 and are secured together via multiple fasteners 63. A sealing member 61, formed of a resilient material, is connected to the bottom of top clamp plate 62. Preferably, the top frame 60 and top clamp plate 62 are formed from aluminum or other lightweight material having similar rigidity and strength. Secured between the top frame 60 and the top clamp plate 62 is the peripheral edge portion 82a of upper membrane 82, which will be described in detail below. Sealing member 61 presses down on the top of upper membrane 82 to facilitate its contact with a manifold 86 when top portion 54 is closed onto bottom portion 56.

The bottom portion 56 of the carrier 50 includes a bottom clamp plate 64, a support plate 65, and a U-shaped bottom frame 66 secured together via multiple fasteners 67. Bottom clamp plate 64 and bottom frame 66 extend around the perimeter of bottom portion 56. Preferably, the clamp plate 64 and bottom frame 66 are formed from aluminum or other lightweight material having similar rigidity and strength, and support plate 65 is formed of a relatively rigid plastic material. Secured between the support plate 65 and the surface of frame 66 is the peripheral edge portion 84a of membrane 84, also described in detail below. A seal member 69, preferably a silicone bead, may be permanently affixed between manifold 86 and lower membrane 84. A pair of open channels 95 are attached to the sides of bottom portion 56, and are sized to receive the arms of robotic arm 29.

The diaphragm assembly 80 includes upper and lower membranes 82 and 84 sealed along peripheral edges thereof to a manifold 86 to form a chamber therebetween for receiving a workpiece. As illustrated in FIG. 7A, the manifold 86 extends around the internal periphery of the carrier 50. Preferably, the manifold 86 is formed from a polymeric or other material, such as aluminum, of sufficient strength to withstand vacuum of about one atmosphere. Although illustrated as having a generally circular cross-section, the manifold 86 may have various cross-sectional shapes.

Referring back to FIGS. 7B and 7C, peripheral edge portions 82a and 84a of respective upper and lower membranes 82 and 84, wrap around a respective portion of the manifold 86, as illustrated, forming a sealed chamber between the upper and lower membranes 82 and 84. The manifold 86 includes multiple apertures 90 which are located near the point of separation of the upper and lower membranes 82 and 84. Accordingly, when a vacuum is created within the manifold 86, air within the chamber is evacuated through the apertures 90. When a workpiece is positioned within the chamber and vacuum is created within the chamber, the upper and lower membranes 82 and 84 are forced together, as shown in FIG. 7B, thereby imposing compressive forces on the workpiece. The workpiece shown in FIG. 7B includes an outsole substrate 12, a midsole substrate 16, and an upper substrate 17, which after being adhered together form a complete shoe. A last L remains in the upper during processing so that the upper retains its shape and transfers the pressure applied by upper membrane 82 to the other substrates.

Prior to the application of a vacuum to manifold 86, membranes 82 and 84 are in their generally flat configurations extending tangentially from upper and lower surfaces of manifold 86, as shown in FIG. 7C. Sealing member 61 presses upper membrane 82 to the top surface of manifold 86 to facilitate initially drawing the vacuum. Seal member 69 also facilitates the initial drawing of a vacuum along lower membrane 82 and the lower surface of manifold 86.

To destroy the vacuum within the sealed chamber, air is introduced into the manifold 86 via an aperture (not shown)

formed therethrough which is in communication with air inlet 70. Air inlet 70 is coupled to a source of pressurized air at pressure relief station 36. To create a vacuum within the sealed chamber, air is removed from the manifold 86 via another aperture 88 which is in communication with air outlet 72. Air outlet 72 is connected to a vacuum source at pressure application station 27. In the illustrated embodiment, both air inlet 70 and air outlet 72 include respective check valves 76 and 74, allowing the drawn vacuum to be held in the chamber between membranes 82 and 84 during the bonding process. Check valves 74, 76 are conventional valves with components that are capable of withstanding processing occurring in the microwave oven.

Preferably, the carrier is formed of microwave transparent materials. For example, silicone rubber sheeting is preferred for the membranes 82, 84 of the carrier 50. Skilled practitioners recognize that the frame, the membranes, and the manifold all can be selected from suitable, essentially microwave-transparent materials, or materials that are otherwise suitable for exposure to microwave energy. For example, rigid parts can be made from aluminum, carbonates, and other essentially rigid compositions of matter. Even though aluminum is a metal which can cause arcing within the oven when exposed to microwave energy, a metal frame may be treated or coated with a material that electrically insulates the metal from the oven to essentially suppress arcing. Similarly, the manifold may be made from silicone rubber or other compositions of matter, particularly elastomers, that can form the required seal, and the membranes may be made from silicone rubber sheeting and other materials that can conform to the shape of the workpiece and apply pressure thereto when a vacuum is drawn in the enclosed volume of the carrier.

Vacuum is drawn from the volume formed by the membranes 82, 84 and the manifold 86 with any known apparatus. For example, a needle can be introduced through a self-sealing portion of the carrier 50, vacuum drawn through the needle, and the needle removed. The self-sealing portion seals the vacuum in. Preferably, a conventional vacuum/pressure quick disconnector is used to draw and release the vacuum, at the pressure application station 27 and the pressure relief station 36, respectively.

For processing workpieces that have a flat part, or at least one part of constant size and shape, at least part of the diaphragms of the universal carrier of the invention can be rigid. The rigid portion can be flat, or can be molded to accommodate that part of the workpiece having constant size and shape.

Figure 7E:
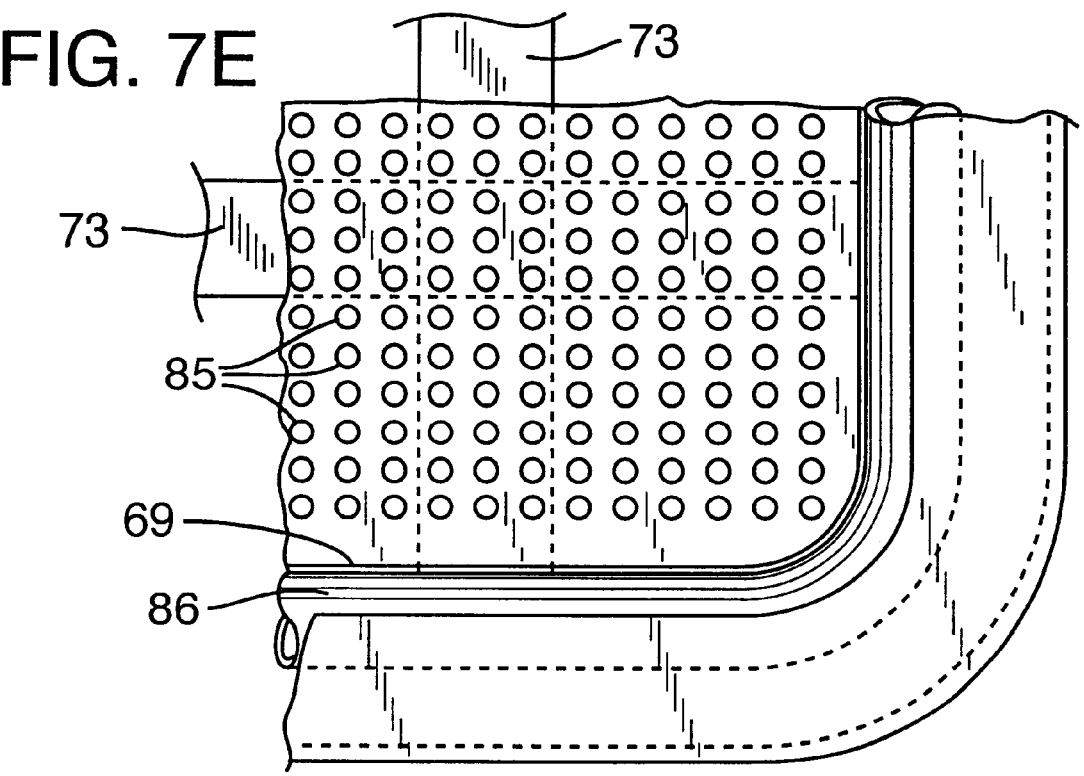

When, as with the manufacture of athletic shoes, the size and shape of each workpiece typically is sufficiently different from other workpieces so as to preclude use of a rigid carrier, it is preferred to use a universal carrier having two flexible diaphragms. In such a case, support plate 65 functions to hold workpieces 10 in place above the plane of the bottom of the carrier. Holes 71, shown in dash-line in FIG. 7A, are formed through support plate 65 to prevent diaphragm 84 from adhering to support plate 65 when a vacuum begins to be drawn. A lighter version of support plate 65 can be used, as long as sufficient support is provided to prevent diaphragm 84 from sagging below the bottom plane of carrier 50 when the workpieces are loaded in the carrier. For example, as shown in FIG. 7E, a lattice work of strips 73, formed from stiff plastic material could be used for the support.

Upper membrane 82 can include a pair outward bulges 87, which are sized to accommodate a workpiece that would include an upper, such as shown in FIG. 7B. A top membrane which incorporates bulges 87 can also be used to assemble sole structures as shown in FIGS. 1A and 1B. Alternatively, if only sole structures are to be bonded, upper membrane 82 can be made from a flat piece of material.

Figure 7F:
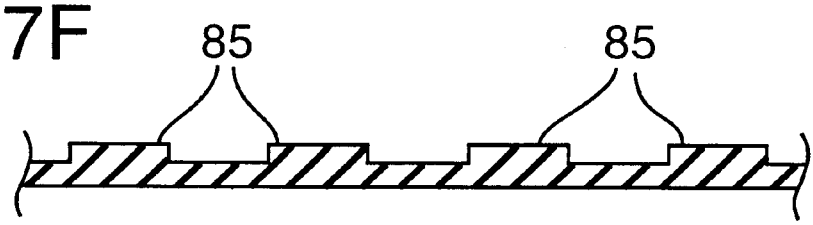

One or both of the membranes 82, 84 may have an embossed or textured surface on the inner side, i.e., on the side in contact with the workpiece. The outer surface of a membrane having an embossed or textured surface on the inner side also may be embossed or textured. In particular, the outside of the membrane may have the "reverse" texture or embossment of the inside. Of course, the outside also may be smooth. The textured or embossed inner surface provides channels which enhance the ability to draw a vacuum in the entirety of the volume enclosed by the membranes 82, 84 by resisting the tendency for the membranes to come together before the entire volume is evacuated and preclude the drawing of the vacuum from a portion of the volume enclosed. FIGS. 7E and 7F illustrate a top inner surface of bottom membrane 84 with has a plurality of raised projections 85 which define the flow channels. Any unevacuated or insufficiently evacuated portion typically is the portion near the workpiece, and the inability to draw vacuum throughout the enclosed volume may preclude application of pressure sufficient to ensure proper bonding of the workpiece.

The manifold 86 forms a seal between the membranes 82, 84, or the frames which hold them, in a manner that affords the ability to establish and maintain a vacuum encompassing the workpiece between the membranes 82, 84.

The illustrated carrier 50 can be used for all sole assemblies, without regard to the size and configuration thereof, Vacuum obtained therein is sufficient to provide pressure needed for a good bond.

The remainder of the processing apparatus, i.e., a variable frequency microwave furnace, apparatus for removing the carrier containing the now bonded assembly therefrom, and apparatus for removing the bonded assembly from the carrier, can be selected by a skilled practitioner with the guidance provided herein. The means by which the carrier is removed from the oven and the bonded assembly separately recovered therefrom are selected to accommodate additional processing. For example, one may wish to perform additional operations on the bonded assembly while it is in the carrier, which may be opened or may remain closed. In particular, a processor may prefer to cool the bonded assembly expeditiously after microwave processing to avoid deformation. In such a case, one may prefer to cool the carrier while it is still closed with the bonded assembly inside, thus helping to ensure that the bonded assembly retains the required shape. As described above, such cooling can be carried out in any manner, such as by immersion in or spraying of a cooling liquid, contact with a cooling surface, or air cooling in an open rack. Alternatively, a processor may prefer to allow the workpiece to be removed from the carrier and put directly into contact with cooling medium. Suitable apparatus can be selected by skilled practitioners with the guidance provided herein.

Various safety protections and sequencing devices also required on such apparatus are known and therefore not described in detail herein. For example, it is appropriate to have safety equipment, such as seals and interlocks, which ensure that microwave energy does not escape from the oven. Also, movement of the workpieces through the oven should be synchronized with the application of microwave energy. These and other devices and controls can be selected by the skilled practitioner.

The above disclosure generally describes the present invention. The following examples illustrate particular embodiments, from which a more complete understanding can be obtained. The following specific examples are provided herein for purposes of illustration only, and are not intended to limit the scope of the invention.

EXAMPLES

Example 1

Peel Strength of Bonded Assemblies Using Thermoplastic Adhesives

Rectangular coupons of the materials described in this example were bonded by exposure to microwave energy in a variable frequency microwave furnace.

A. SBR 100, a butyl rubber/nitrile rubber blend, was coated with Bemis 5251, a thermoplastic adhesive. A second SBR 100 substrate layer was added to form a workpiece. The workpiece was irradiated with microwave energy in the frequency range from about 4.6 GHz to about 6.1 GHz at a sweep rate of 0.2 seconds for a period of approximately one minute. Bond strength was less than about 2.5 kg/cm, even though uniform heating to the desired temperature had been achieved. Bonding strength was improved to an acceptable level, i.e., greater than 2.5 kg/cm, by coating the SBR 100 with a neoprene film.

B. Neoprene-coated rubber, such as would be appropriate for outsoles of athletic shoes, was bonded to ethylene vinyl acetate foam, such as would be appropriate for midsoles of athletic shoes, using the following three types of thermoplastic adhesives available from Bemis Co.:

(1) carbon-filled polyester based (Bemis C5251);

(2) unfilled polyester based (Bemis 5251); and (3) polyolefin based (Bemis 6218).

Each workpiece was irradiated with microwave energy in the frequency range from about 4.6 GHz to about 6.1 GHz at a sweep rate of 0.2 seconds for a period of approximately one to one and one-half minutes. The coupons were 6 inches by 2 inches.

The resultant bonded assemblies then were subjected to peel tests to determine the failure mode and peel strength for each sample.

Each bonded assembly containing polyester-based adhesive failed at the ethylene vinyl acetate/adhesive interface. In contradistinction, each bonded assembly containing polyolefin-based adhesive failed at the rubber/adhesive interface. These examples highlighted the need to select adhesive appropriate for the substrates to be bonded.

C. In view of the results of Parts A and B of this Example, 6 inch by 1 inch coupons of ethylene vinyl acetate were bonded to neoprene rubber by forming the following workpiece: 1 layer of neoprene-coated rubber; polyolefin-based adhesive; 2 layers of carbon-filled polyester based adhesive; and 1 layer of ethylene vinyl acetate.

The workpieces were irradiated with microwave energy at a frequency range of 4.6 to 6.1 GHz with a sweep rate of 0.2 seconds and a nominal power input of 250 W. The heating time varied, as set forth below. The resultant peel strength and failure mode of the bonded assemblies are set forth in the following table:

| Heating Time, sec | Peel Strength, kg/cm | Failure Mode |
|---|---|---|
| 70 | 4.0 | EVA |
| 70 | 3.5 | Neoprene/C5251 |
| 70 | 3.3 | Neoprene/C5251 |
| 80 | 4.3 | Half EVA, half Neoprene/C5251 |
| 80 | 3.9 | EVA |
| 80 | 4.1 | EVA |
| 90 | 4.1 | EVA |
| 90 | 3.3 | EVA |
| 90 | 3.3 | EVA |
| 90 | 3.7 | EVA |

D. Workpieces were formed in accordance with the following: polyurethane substrate, polyester based adhesive, neoprene-coated rubber. The workpiece was irradiated with microwave energy in the frequency range from about 4.6 GHz to about 6.1 GHz at a sweep rate of 0.2 seconds for a period of approximately one to one and one-half minute. The rubber stretched severely during attempts to delaminate the bonded assembly. Peel strength easily exceed 2.5 kg/cm, and was as much as 7 kg/cm for some samples.

Example 2

Processing of an Athletic Shoe Workpiece

A plurality of workpieces comprising a neoprene rubber outsole, a nylon shank, and an ethylene vinyl acetate foam midsole were assembled with H. B. Fuller HL6444 adhesive. The nylon shank was completely surrounded by the other substrates in the completed workpieces. The bonding temperature of the adhesive was 170° C.

Paper that indicated whether a temperature of 170° C. was reached was placed over an outsole/shank assembly. The assembly was placed in the microwave oven. The workpiece was irradiated with 1.5 kW microwave energy in a frequency range of from 5.585 to 6.425 GHz with a sweep rate of 0.2 seconds. The temperature-indicating paper indicated that the 170° C. bonding temperature was reached substantially uniformly throughout the adhesive.

The workpieces then were completed and processed in accordance with one of the following methods, each of which is an embodiment of the method of the invention. Each workpiece was placed in a carrier which was evacuated to apply pressure uniformly about the workpiece. The dimensions of the variable frequency microwave furnace were 12 inches×12 inches×10 inches.

A. An ethylene vinyl acetate foam substrate was put in place over the outsole/shank assembly and the workpiece was placed in the microwave oven. The workpiece was irradiated with 1.5 kW microwave energy in a frequency range of from 5.585 to 6.425 GHz with a sweep rate of 0.2 seconds. Bonding was accomplished in 40 seconds.

B. An outsole/shank assembly was heated to 90° C. The ethylene vinyl acetate substrate was put in place and the workpiece was processed with 1.2 kW microwave energy at a frequency range of 5.85 to 7.0 GHz for between about 25 and 30 seconds. Bonding temperature of 170° C. was reached and bonding was achieved. The temperature of the bottom surface of the outsole was 90° C. after processing.

C. Two outsole/shank assemblies are heated to 90° C. An ethylene vinyl acetate substrate is put in place on each assembly and the workpieces are processed with 2 kW microwave energy at a frequency range of 5.85 to 7.0 GHz for between about 25 and 30 seconds. Bonding temperature of 170° C. is reached and bonding is achieved.

D. Two outsole/shank assemblies are heated to 130° C. An ethylene vinyl acetate substrate is put in place on each assembly and the workpieces are processed with 2 kW microwave energy at a frequency range of 5.85 to 7.0 GHz for between about 20 seconds. Bonding temperature of 170° C. is reached and bonding is achieved.

That which is claimed is:

1. An apparatus for applying pressure to a workpiece irradiated with microwave energy comprising:

a frame formed of a top frame portion and a bottom frame portion that are pivotally connected to each other, said frame being in an open position when said top frame portion is pivoted out of contact with said bottom frame portion, and said frame being in a closed position when said top frame portion is pivoted into contact with said bottom frame portion;

a diaphragm assembly situated within said frame and having an upper membrane and a lower membrane, said upper membrane being attached to said top frame portion and said lower membrane being attached to said bottom frame portion, at least one of said membranes being substantially microwave transparent and flexible to conform to a shape of the workpiece, said membranes separating such that the workpiece may be placed between said upper membrane and said lower membrane when said frame is in said open position;

a manifold positioned adjacent to substantially all of a perimeter of said membranes and between said membranes to form a chamber between said membranes and said manifold for receiving the workpiece, said manifold having a plurality of apertures adjacent to said chamber for evacuating air from within said chamber and around the workpiece such that said membranes are drawn into a contacting relationship with each other in an area between said workpiece and said manifold; and a sealing member that presses said upper membrane into contact with said manifold to facilitate the formation of a seal between said upper membrane and said manifold when said frame is in said closed position.

2. The apparatus of claim 1, wherein said frame is coated with an electrical insulator to suppress arcing when said frame is exposed to microwave energy.

3. The apparatus of claim 1, wherein said frame is formed of substantially microwave transparent material.

4. The apparatus of claim 1, wherein at least one of said membranes is textured to enhance the ability to draw a vacuum within said chamber and around the workpiece.

5. The apparatus of claim 1, wherein said membranes are formed from silicone rubber.

6. The apparatus of claim 1, wherein at least one of said membranes includes at least one bulge to accommodate the shape of the workpiece.

7. A system for bonding a workpiece having a plurality of substrates, said system comprising:

a plurality of processing stations including:
an assembly station at which the substrates are assembled into a workpiece,
a pressure application station which includes a device for removing air from around the workpiece,
a microwave energy application station at which variable frequency microwave energy is applied to bond the substrates to one another, and a cooling station at which the workpiece cools after the application of microwave energy; and a carrier for carrying the workpiece, said carrier including:
a frame formed of a top frame portion and a bottom frame portion that are pivotally connected to each other, said frame being in an open position when said top frame portion is pivoted out of contact with said bottom frame portion, and said frame being in a closed position when said top frame portion is pivoted into contact with said bottom frame portion, a diaphragm assembly situated within said frame and having an upper membrane and a lower membrane, said upper membrane being attached to said top frame portion and said lower membrane being attached to said bottom frame portion, at least one of said membranes being substantially microwave transparent and flexible to conform to a shape of the workpiece, said membranes separating such that the workpiece may be placed between said upper membrane and said lower membrane when said frame is in said open position, a manifold positioned adjacent to substantially all of a perimeter of said membranes and between said membranes to form a chamber between said membranes and said manifold for receiving the workpiece, said manifold having a plurality of apertures adjacent to said chamber for evacuating air from within said chamber and around the workpiece such that said membranes are drawn into a contacting relationship with each other in an area between said workpiece and said manifold, and a sealing member that presses said upper membrane into contact with said manifold to facilitate the formation of a seal between said upper membrane and said manifold when said frame is in said closed position; and a transport mechanism for moving said carrier between said plurality of processing stations.

8. The system of claim 7 wherein said transport mechanism includes a conveyer for moving said carrier from said assembly station to a pressure application station where a device for removing air applies a vacuum to said chamber.

9. The system of claim 7, wherein said microwave energy application station includes an irradiating device for irradiating the workpiece with microwave energy.

10. The system of claim 9, wherein said irradiating device comprises a mechanism for sweeping the workpiece with at least one window of microwave frequencies selected to heat an adhesive in the workpiece without heating other portions of the workpiece above a predetermined temperature.

11. The system of claim 7, wherein said frame is coated with electrical insulator to suppress arcing when said frame is exposed to microwave energy.

12. The system of claim 7, wherein said frame is formed of substantially microwave transparent material.

13. The apparatus of claim 7, wherein at least one of said membranes is textured to enhance the ability to draw a vacuum within said chamber and around the workpiece.

14. The system of claim 7, wherein said membranes are formed from silicone rubber.

15. The system of claim 7, wherein at least one of said membranes includes at least one bulge to accommodate the shape of the workpiece.

* * * * *